Feb. 11, 1936.    S. R. HARDING    2,030,207
EDUCATIONAL TEST CHECKING MACHINE
Filed March 27, 1933    6 Sheets-Sheet 1

Inventor
Samuel R. Harding
By his Attorneys

Feb. 11, 1936.    S. R. HARDING    2,030,207
EDUCATIONAL TEST CHECKING MACHINE
Filed March 27, 1933    6 Sheets-Sheet 2

Patented Feb. 11, 1936

2,030,207

UNITED STATES PATENT OFFICE 2,030,207

EDUCATIONAL TEST CHECKING MACHINE

Samuel R. Harding, Aberdeen, S. Dak.

Application March 27, 1933, Serial No. 662,866

24 Claims. (Cl. 101—102)

My invention relates to improvements in educational test checking machines for schools and the like and the objects of the improvements are first, to provide mechanical means for individually selecting incorrect from correct answers on a certain educational test paper and record the same; second, to count and record the total number of incorrect answers; and third, to make a "Frequency of error" record of the total number of incorrect answers on a set of like test papers.

By the use of this machine a teacher saves a great deal of time in correcting a set of test papers and is also given information, as soon as the set of papers for a class have been corrected, as to the exact number of times each question of the test was answered incorrectly by the members of the class as a whole.

To the above end, generally stated, the invention consists of the novel devices and combinations of devices hereinafter described and defined in the claims.

In the accompanying drawings, which illustrate the invention, like characters indicate like parts throughout the several views.

Referring to the drawings:

Fig. 17 is a fragmentary view of the question sheet;

Fig. 19 is a fragmentary perspective view showing a modification for rendering the selector pins inoperative.

The numeral 1 indicates a rectangular box-like housing having at its corners short supporting legs 2. This housing 1 has an open front and the top is closed by a table or bed 3 having a deep depending central portion. Co-operating with the bed 3 is a heavy flat head 4 attached to said housing by a hinge 5 for opening movement into a horizontal position in which it is entirely rearwardly of the housing 1, see Fig. 4. A handle-equipped spring latch 6 normally holds the head 4 locked to the housing 1 in an operative position.

Formed in the under side of the head 4 is a multiplicity of deep slot-like ways 7 which extend transversely thereof and are arranged in two rows of fifty ways each. In each way 7 is a type slug or bar 8 normally held in place by front and rear ledges 9 and 10 which extend transversely across the ways 7 at the ends thereof. These ledges 9 and 10 hold the slugs 8 with freedom for a limited endwise sliding movement in the ways 7 and for slight rocking movement in the planes thereof on the ledges 9. Any number of slugs 8 may be used depending upon the capacity of the machine.

It may be here stated that in the present arrangement of the machine there is one slug 8 for the answer of a given question and in the present instance one hundred questions may be answered; or a plurality of slugs 8 may be set aside and any one used to answer a multiple choice question; or a plurality of slugs 8 may be used for answering the matching type of question, as will hereinafter appear.

Figures 4, 18:
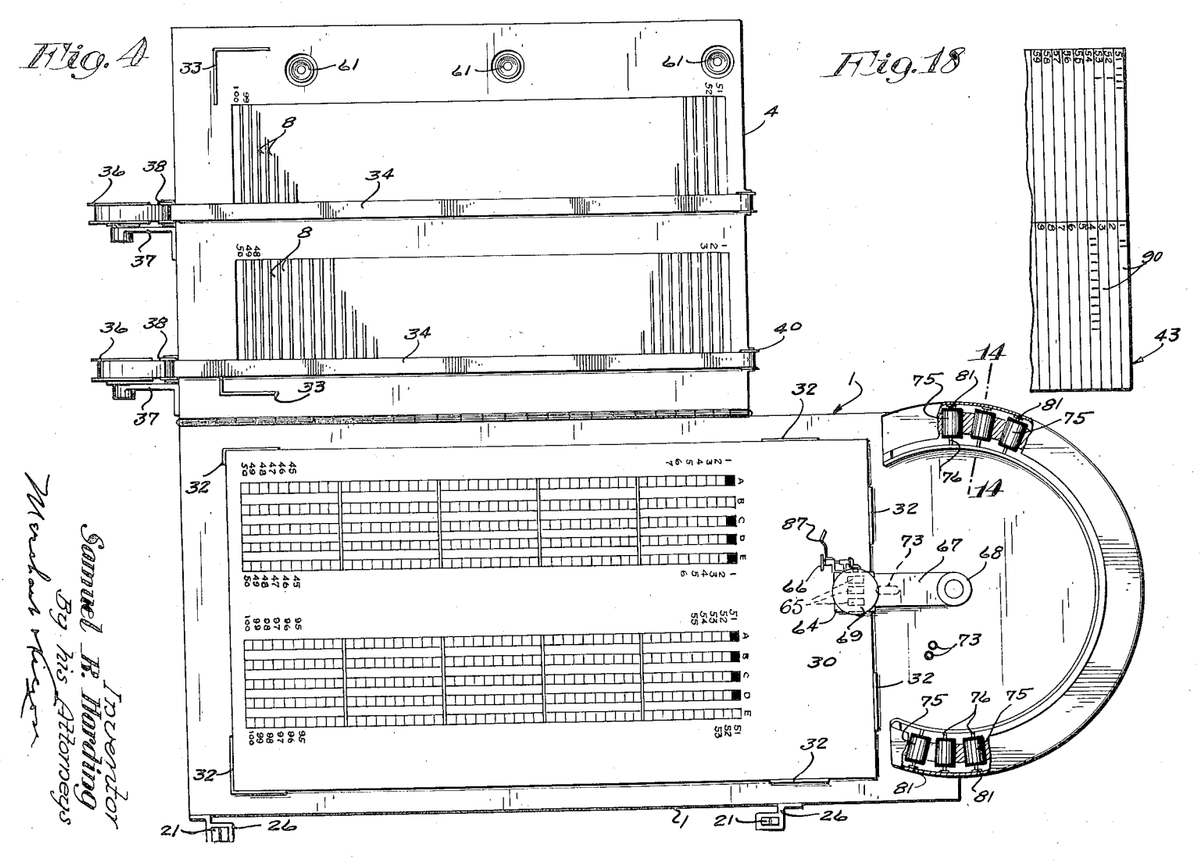
Fig. 4 is a plan view of the improved machine with the head open and with the answer sheet removed to expose the underlying key sheet.
Fig. 18 is a fragmentary view of the frequency of error sheet removed from the machine.
Figures 6, 7, 8, 9, 10, 11:
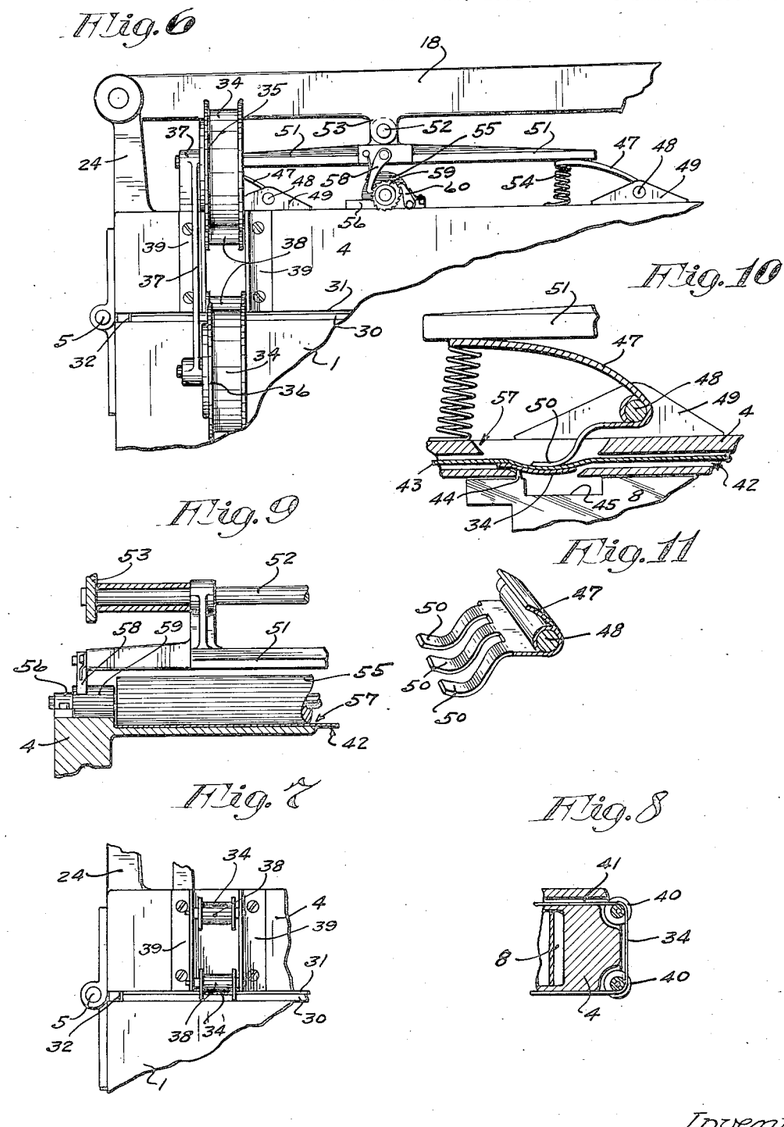
Fig. 6 is a fragmentary left hand end elevation of the improved machine, on an enlarged scale.
Fig. 7 is a fragmentary detail view with some parts sectioned on the line 7—7 of Fig. 1.
Fig. 8 is a fragmentary detail view principally in section taken on the line 8—8 of Fig. 1.
Fig. 9 is a fragmentary detail view with some parts sectioned on the line 9—9 of Fig. 1, on an enlarged scale.
Fig. 11 is a fragmentary perspective view of certain of the presser fingers and associated parts.

The slugs 8 in the left hand column as they appear when the cover is open, as shown in Fig. 4, are designated by the numerals 1 to 50 and the right hand column of said slugs are designated by the numerals 51 to 100. For the sake of convenience the ways 7 and the slugs 8 mounted thereon have been designated by the numerals 1 to 50 and 51 to 100, see Fig. 4, which corresponds to the numbering of the rows of squares on the two sheets 30 and 31.

Formed in each slug 8, at the lower longitudinal edge thereof, are, as shown, five deep notches 11 that are spaced longitudinally of said slug equi-distant apart. These notches 11 are further designated individually by the letters A′, B′, C′, D′, E′ which read from the left to the right, see Fig. 3. The left hand edge of each notch 11 is perpendicular to the lower longitudinal edge thereof and the right hand edge of said notch is oblique and affords a cam surface 12, for a purpose that will presently appear.

Formed with the lower longitudinal edge of each slug 8, near the left hand end thereof, is a depending type character 13. Normally, the slugs 8 are in their extreme left hand positions and in which positions the type characters 13 rest on the ledges 10, as shown in the left hand row of slugs 8 in Fig. 3.

For each slug 8 are five upright selector pins 14, one for each cam surface 12, and each pin includes two endwise spaced sections connected by a coiled spring 15. All of the pins 14 are simultaneously projected or retracted by a carrier 16 in the form of a flat horizontal plate below the bed 3 and having vertical holes in which the lower end portions of the lower sections of the pins 14 are rigidly secured. The pins 14 extend through guide holes 17 in the bed 3. The upper sections of the pins 14, in the upper portions of the holes 17, have a working fit with the bed 3 and the springs 15, in the lower portions of said holes, have a working fit with said bed. When the carrier 16 is operated to project the selector pins 14, said pins if not interrupted, will engage the respective cam surfaces 12 and move the slugs 8 to the right, as shown in the right hand row of slugs 8 in Fig. 3.

The following connections are provided for lifting the carrier 16 to project the selector pins 14, for releasing said carrier and permitting the same to drop by gravity to retract the selector pins 14, to wit: A bail-like hand lever 18 overlying the head 4, a pair of levers 19 in the housing 1 intermediately pivoted to bearings 20 on the bottom of said housing, a pair of long upright links 21 connecting the arms of the lever 18 to the levers 19, at their front ends, and a pair of short levers 22 connecting said levers 19, at their rear ends, to bearings 23 on the under side of the carrier 16. The arms of the lever 18 are fulcrumed to bearings 24 on the head 4, at the rear corners thereof. A handle 25, formed with the transverse portion of the lever 18 at the longitudinal center thereof, affords means by which said lever may be manipulated. It will be noted that the handle 25 directly overlies the handle of the latch 6 so that they may be easily manipulated.

In order to permit the head 4 to be opened and closed the links 21 are transversely divided and the upper sections thereof are integral with the arms of the lever 18 and the lower sections of said links are pivoted to the levers 19 and work in guides 26 secured to the housing 1. The weight of the carrier 16, when released, is such that it will drop by gravity and raise the lever 18 through the connections 19, 21—22.

Figures 2, 12, 16:
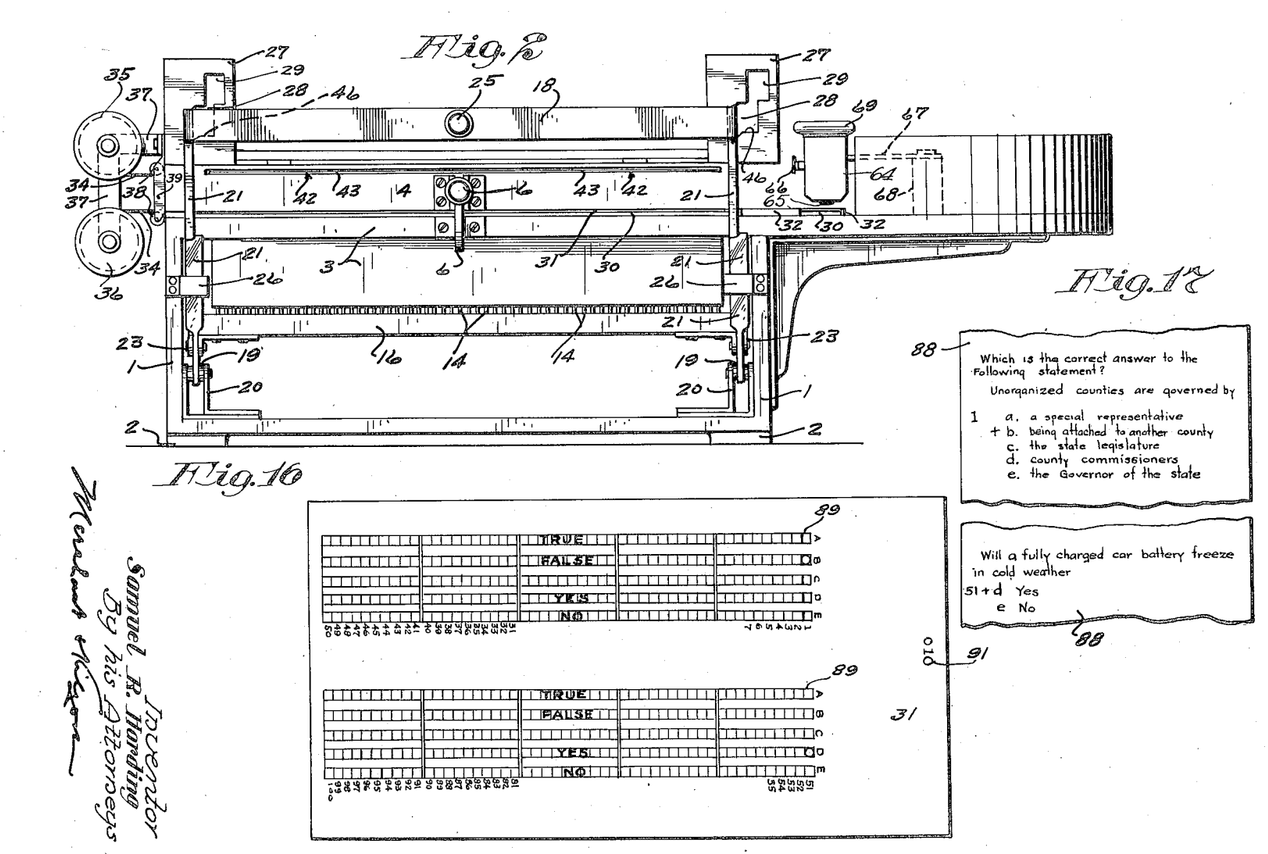
Fig. 2 is a front elevation of the improved machine.
Fig. 12 is a fragmentary detail view showing the upper end portion of one of the selector pins and associated parts of the machine, on an enlarged scale.
Fig. 16 is a plan view of the answer sheet removed from the machine.
Figures 3, 5, 10, 12:
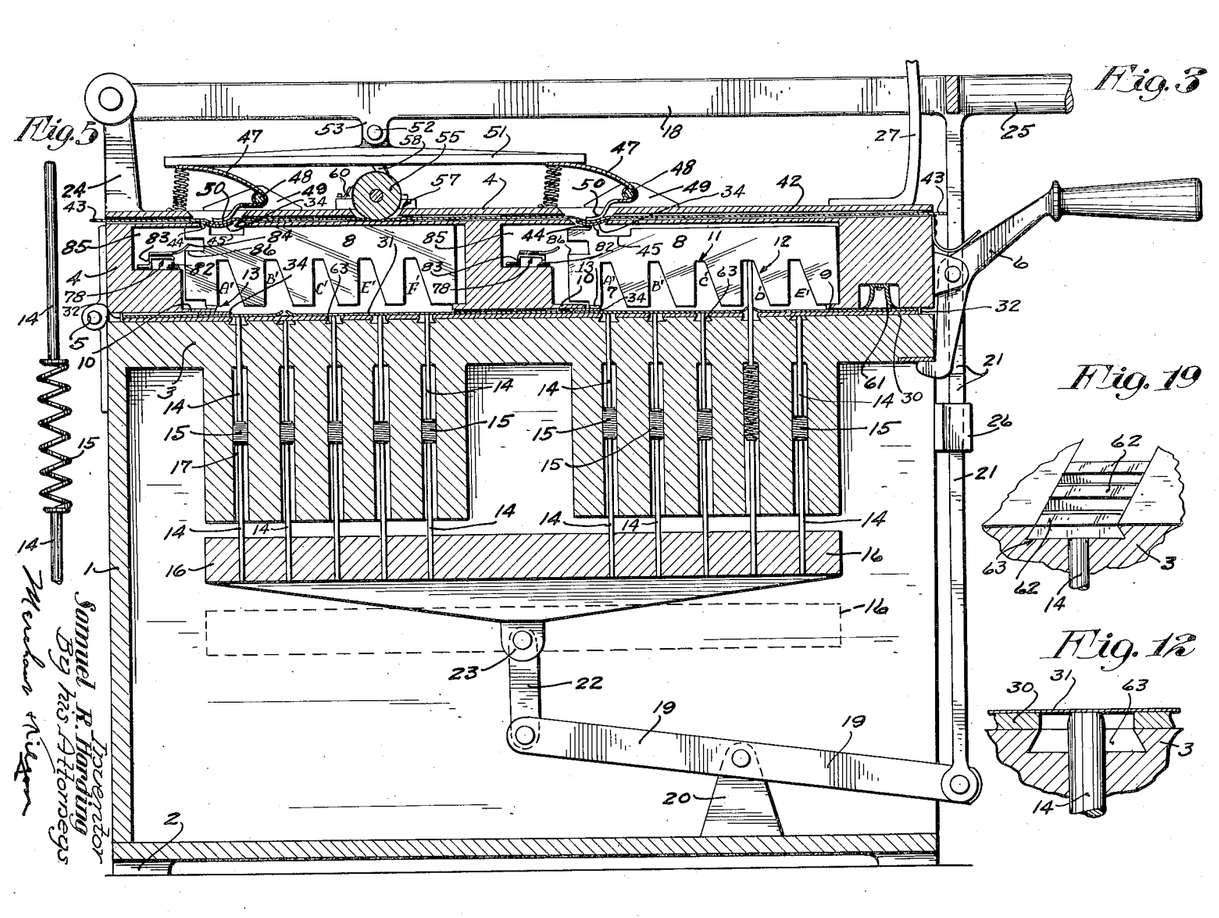
Fig. 3 is a transverse vertical section taken on the irregular line 3—3 of Fig. 1, on an enlarged scale.
Fig. 5 is an elevation of one of the selector pins removed from the machine, on an enlarged scale, a portion of the lower section being broken away.
Fig. 10 is a fragmentary detail view principally in section taken on the line 10—10 of Fig. 1, on an enlarged scale.

To lock the lever 18 in a position to hold the carrier 16 raised, as shown by full lines in Fig. 3, there is provided a pair of gates 27 having apertures through which the arms of the lever 18 extend, see Fig. 2. The pivotal connections between the arms of the lever 18 and the bearings 24 are such as to permit a limited angular movement of said lever in the plane thereof. This angular movement of the lever 18 permits its arms, when said lever is depressed to hold the carrier 16 raised, to be moved laterally to the left into lower lock notches 28 in the gate 27 and hold said lever in its operative position. To raise the lever 18 it is first moved angularly to the right to release its arms from the lower lock notches 28 and then lifted and moved laterally to the right into lock notches 29 in the gates 27. Obviously, as the lever 18 is raised the carrier 16 will be returned to normal position under the action of gravity. When the arms of the lever 18 are in the lock notches 29, said lever is held against lifting movement and limits the lowering movement of the carrier 16, as shown by broken lines in Fig. 3, with the upper ends of the selector pins 14 below the upper face of the bed 3.

Used in connection with the improved machine is a key sheet 30 and an answer sheet 31. These two sheets 30—31 will hereinafter be fully described but it may be here stated that they are of the same size and are divided into like areas having like designations. The key sheet 30 is prepared by cutting out certain of its areas and the answer sheet 31 is prepared by piercing certain of its areas. These two sheets 30—31, when placed in the machine, rest on the bed 3 and are held, by upright register guides 32 fixed on said bed, see Fig. 4, with corresponding areas having the same designations in coincident relation so that if a pierced area on the sheet 31 is in registration with a cut out area on the sheet 30 they will form aligned holes that extend completely through the sheets 30—31.

When the two sheets 30—31 are held positioned on the bed 3 by the register guides 32, each pair of coincident areas thereon is directly over one of the selector pins 14 so that if there are aligned holes in said areas the selector pins 14, when projected, will pass therethrough, engage the aligned cam surface 12 of the overlying slug 8 and move said slug from normal position.

All the register guides 32 are outward of the head 4, with the exception of the two left hand guides, and these are in the form of angles which extend into correspondingly formed slots 33 in the under side of said head when closed.

Co-operating with the type characters 13, on the slugs 8 in each row, is an inking ribbon 34 that extends transversely of the respective ways 7 and the slugs 8. The end portions of each ribbon 34 are wound, the one on an upper reel 35 and the other on a lower reel 36. These two reels 35—36 are removably journaled on a bracket 37 secured to the head 4 at its left hand end and the ribbon 34, adjacent the said reels, runs over a pair of flanged guide rolls 38 journaled on a bracket 39 secured to the head 4. At the right hand end of the machine the ribbon 34 runs over a pair of flanged guide rolls 40 journaled on the head 4. The lower section of the ribbon 34 is on the under side of the head 4 between the answer sheet 31 and the type characters 13 and said ribbon, in part, is transversely covered at each way by the respective ledges 10. The upper section of the ribbon 34 extends longitudinally through a passage 41 in the top of the head 4, just above the ways 7, and opening into each way, for a purpose that will presently appear.

Normally the slugs 8 are in their extreme left hand positions and the type characters 13 rest on the ledges 10, but when said slugs are moved to the right by the selector pins 14, said characters are moved from the ledges 10 and allow the respective end portions of the slugs 8 to drop and position the characters 13 on the ribbon 34 for printing action on the answer sheet 31.

Formed in the head 4, above the ways 7, is a passage 42 for a frequency of error sheet 43 which extends longitudinally through said head and substantially the full width thereof so that said sheets overlie all of the slugs 8. The upper sections of the ribbons 34 extend between the slugs 8 and the frequency of error sheet 43 where the ways 7 open into the passages 42.

Each slug 8 has formed therewith, substantially directly above its type character 13, a type character 44 on which the ribbon 34 rests. A notch 45 is formed in each slug 8, to the right of its type character 44, and which notch affords clearance for the ribbon 34 when said slug is in its normal or left hand position and thus prevent pressure on said ribbon that would produce an imprint of the type character 44 on the frequency of error sheet 43 when in its normal or left hand position.

The operation of the machine, as well as the description of the key sheet 30, the answer sheet 31, and the frequency of error sheet 43, will hereinafter be fully described, but it is thought necessary at this time to briefly state that each time the machine is operated to correct an answer sheet 31, the head 4 must be open, as shown in Fig. 4, with all of the slugs 8 in their extreme left hand positions and the arms of the lever 18 in the uppermost lock notch 29 of the gate 27. When the head 4 is open the upper sections of the links 21 are, of course, separated from the lower sections thereof and at which time the carrier 16 is in its lowermost position and holds the selector pins 14 retracted with their springs expanded to their full lengths. As previously stated, when the carrier 16 is in its lowermost position, the upper ends of the selector pins 14 are below the upper face of the bed 3.

With the machine thus adjusted the key sheet 30 is placed on the bed 3 and the answer sheet 31 placed on said key sheet and said sheets positioned by the register guides 32. Next, the head 4 is closed and secured by the latch 6 and thereafter the lever 18 is moved laterally out of the lock notches 29 and downwardly until stopped by stop surfaces 46 on the gates 27 between the lock notches 28 and 29. This downward movement of the lever 18 lifts the carrier 16 through the connections 19, 21—22 and simultaneously projects the selector pins 14.

The upper sections of the selector pins 14, which engage either of the sheets 30—31, will be stopped and the respective springs 15 compressed, but not to their full extent, to compensate for further movement of the lower sections of said pins and the upper sections of the selector pins that pass through aligned holes in said sheets will engage the aligned cam surfaces 12 and move the respective slugs 8 from normal position and which slugs represent wrong answers on the answer sheet 31.

As previously stated, the lever 18, at this time, is on the stop surfaces 46 and to continue the operation of the machine said lever is moved from these stop surfaces to the left and downwardly into the lock notches 28. This final downward movement of the lever 18 performs another important function in that it operates certain mechanism that causes the type characters 13 on the slugs 8, that have been operated by the selector pins 14 and represent wrong answers, to make an imprint on the answer sheet 31 and also cause the respective type characters 44 to make an imprint on the frequency of error sheet 43. This further downward movement of the lever 18 will further compress the springs 15 of the selector pins 14, the upper sections of which have been stopped by either of the sheets 30—31.

The mechanism above referred to includes a pair of presser bars 47 which extend longitudinally over the head 4 and are mounted on horizontal shafts 48 to turn about their axes and which shafts are journaled in upstanding bearings 49 on the head 4. Spring fingers 50, formed with the presser bars 47 directly under the shafts 48, extend downwardly and rearwardly therefrom. There is one of these spring fingers 50 for each slug 8 and which finger extends longitudinally thereover for applying yielding pressure thereto. When the slugs 8 are in their left hand or normal positions, their notches 45 are directly below the spring fingers 50 and thus prevent pressure on the slugs 8. Movement of the slugs 8 by the selector pins 14 into their right hand positions will position their type characters 44 directly under the spring fingers 50.

Both presser bars 47 are simultaneously depressed and simultaneously released by a horizontal rectangular presser plate 51 suspended, at its transverse center, from a shaft 52 for turning movement about the axis thereof. This shaft 52, at its ends, is mounted in bearings 53 on the arms of the lever 18. Coiled springs 54, compressed between the top of the head 4 and the free longitudinal edge portions of the presser bars 47 yieldingly hold said bars in contact with the presser plates 51 for movement therewith when the presser plate 51 is raised.

A step of movement is imparted to the frequency of error sheet 43 for each cycle of operation of the machine by means of a long feed roll 55 which extends longitudinally of the head 4 directly under the shaft 52 and is journaled at its ends in bearings 56 on said head. A long slot 57 in the head 4 exposes the frequency of error sheet 43 to the action of the feed roll 55 which works in said slot. Steps of rotary movement are imparted to the feed roll 55 by a pawl 58 and a co-operating ratchet wheel 59, the former of which is pivoted to the presser plate 51 and the latter of which is on one of the trunnions of the feed roll 55. A dog 60, pivoted to one of the bearings 56, co-operates with the ratchet wheel 59 to prevent backward rotation of the feed roll 55. Each time the lever 18 is depressed the pawl 58 is moved over the ratchet wheel 59 and when said lever is raised, the pawl 58 will engage one of the teeth of the ratchet wheel 59 and impart a step of rotary movement to the feed roll 55.

Slugs 8 moved to the right by the selector pins 14 will carry their type characters 13 from the ledges 10 and allow the respective ends of said slugs to drop by gravity and position the characters 13 on the underlying sections of the ribbons 34.

As previously stated, initial movement of the lever 18 from the lock notches 29 to the stop surfaces 46 projects the selector pins 14 and further movement of the lever 18 from said surfaces, downwardly into the lock notches 28, imparts the necessary downward movement to the presser plate 51 to rock the presser bars 47 on their shafts 48. This movement of the presser bars 47 swings their spring fingers 50 downwardly and applies yielding pressure to the underlying or wrong answer slugs 8 which have been moved to the right by certain of the selector pins 14 and which slugs find a base of resistance on the bed 3. The type characters 13 of the projected slugs 8 rest on the lower sections of the ribbons 34 and the upper sections of said ribbons rest on the type characters 44 and the pressure applied by the spring fingers 50 causes the type characters 13—44 to make their imprints, the former on the answer sheet 31 and the latter on the frequency of error sheet 43.

Obviously, downward pressure on the wrong answer slugs 8 by the fingers 50 simultaneously cause imprints of the type characters 44 to be made on the frequency of error sheet 43 and imprints of the type characters 13 to be made on the answer sheet 31. The imprints made by the type characters 13—44 are to indicate on the answer sheet 31 wrong answers made by an individual student when taking a test and to indicate on the frequency of error sheet 43 wrong answers made by all of the students of a class taking the test.

To lift the answer sheet 31 from the key sheet 30 or from the bed 3, there is provided a plurality of vacuum cups 61 which, as shown, are mounted in recesses in the head 4, at the front thereof, and attached to said head. These vacuum cups 61 are arranged so that the final closing movement of the head 4 will press the same onto the answer sheet 31 so that when said head is opened the answer sheet 31 will be lifted by said vacuum cups into a position in which said sheet may be very quickly and easily removed from the machine.

In place of using the key sheet 30 to intercept the projection of the selector pins 14 at certain times, as will hereinafter appear, there is provided a plurality of individual slides 62. These slides 62 are removably mounted in channels 63 formed in the top of the bed 3 and have dovetailed interlocking engagement with said bed at the sides of said channel, see Fig. 19. There is one of these channels 63 for each longitudinal row of selector pins 14 and one of the slides 62 may be positioned over any one of the selector pins 14 to intercept the projecting movement thereof.

As previously stated the slugs 8 are only moved by the selector pins 14 when an incorrect answer is given and the moved slugs 8 operated to produce imprints of the type characters 13 on the answer sheet 31. Mechanism is provided for counting the incorrect answers on an answer sheet 31 and stamping or otherwise indicating the total number of incorrect answers on said sheet before it is removed from the machine.

Counter

The wrong answer counting mechanism includes a counter of any well known construction of the type having exposed inked numerals which, when pressed onto an object, leave their impression. This counter is indicated as an entirety by the numeral 64 with the exception of its rotatable members 65 having type characters and a star wheel 66. This star wheel 66 intermittently operates connections for imparting steps of rotary movement to the rotatable members 65. The counter 64 is carried on the free end of a horizontally disposed spring arm 67 mounted on an upstanding post 68 secured to the bed 3, at the right of the head 4, for swinging movement about the axis of said post. Normally, the arm 67 holds the counter 64 above the bed 3 for movement into a position over the upper end portion of the answer sheet 31. On top of the counter 64 is a hand piece 69 to which pressure may be applied to spring the arm 67 and position the exposed type character or characters on the counter members 65 and cause the same to leave an imprint on the answer sheet 31.

Electrically operated means is provided for imparting a step of rotary movement to the star wheel 66 for each slug 8 when moved into its wrong answer position by one of the selector pins 14. This electrically operated means for each slug 8 includes a source of potential 70, one side of which is connected to a ground 71 and the other side of which is connected to a common lead 72 in which is interposed a switch 73 comprising two fixed contacts on the bed 3 and a cooperating movable contact on the carrier arm 67. Connected to the common lead 72 is a branch lead 74 for each slug 8 and which branch lead is connected to one side of a magnetic coil 75 having a floating core 76. The other side of each coil 75 is connected to a ground 77. A switch 78, under strain to close, is interposed in each branch lead 74.

Figure 14:
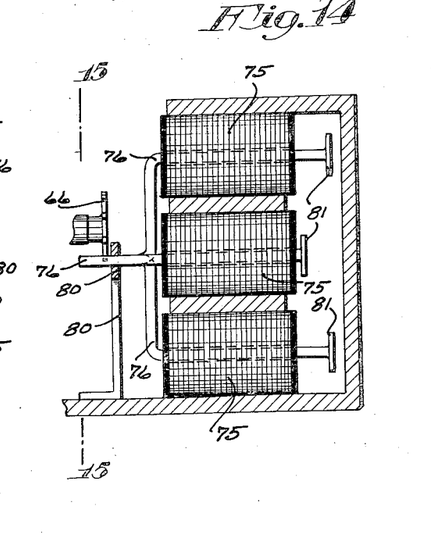
Fig. 14 is a view partly in elevation and partly in vertical section taken on the line 14—14 of Fig. 4, on an enlarged scale, and the counter in a different position.
Figure 15:
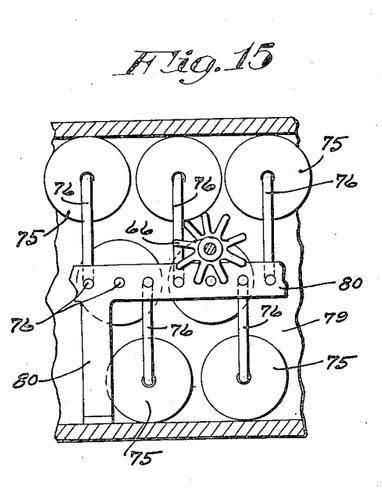
Fig. 15 is a view partly in elevation and partly in section taken on the line 15—15 of Fig. 14.

The coils 75 are mounted in a segmental housing 79 on the bed 3, to the right of the head 4, and the center of the segment is at the axis of the post 68. This housing 79 is closed, except at its inner face, and the cores 76, at their outer end portions, work in guide holes in an annular guide ring 80 concentric with said housing and which ring is supported by legs secured to the bed 3. It will be noted that the cores 76 are arranged in upper, intermediate and lower horizontal rows and that the cores 76 of the intermediate row are straight while the cores 76 of the upper and lower rows, outward of the coils 75, are bent to bring their outer end portions into the same horizontal plane as the outer end portion of the cores 76 of the intermediate row. On the rear end of the cores 76 are heads 81 which limit the projecting movement of said cores, see Figs. 14 and 15. The free end portions of the cores 76, when projected, are in the path of movement of the star wheel 66 and when the carrier arm 67 is swung about the axis of the post 68, said star wheel is progressively brought into registration with the projected cores 76 and each of said cores will impart a step of rotary movement to the star wheel 66.

Each switch 78 includes a fixed contact 82 and a co-operating movable or spring contact 83, the latter of which is under strain to close and engage said fixed contact. On each movable contact 83 is a forwardly projecting trip finger 84. The switches 78 are mounted on the head 4 in recesses 85 that form extensions of the ways 7. The trip fingers 84 extend into the ways 7 and are engaged by shoulders 86 on the slugs 8 when in normal positions and hold the movable switch contacts 83 out of engagement with the fixed switch contacts 82 and break the branch leads 74, see Fig. 3.

Figure 13:
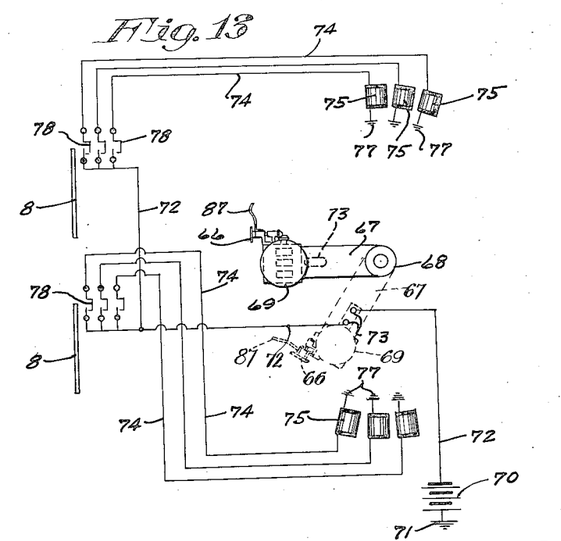
Fig. 13 is a wiring diagram for the counter.

When the slugs 8 are moved into wrong answer positions by the projected selector pins 14, the shoulders 86 are moved out of engagement with the trip fingers 84 and allow the movable switch contacts 83 to spring into engagement with the fixed contacts 82. The closing of the switches 78 completes the branch lead 74, energizes the coils 75 and projects the cores 76 in the path of movement of the star wheel 66. The initial bodily anti-clockwise movement of the counter 64 moves the movable contact of the switch 73 out of engagement with the fixed contact of said switch which breaks the lead 72 and deenergizes the coils 75. Further anti-clockwise movement of the counter 64 will carry the star wheel 66 into contact with the projected cores 76 and thereby impart step by step movement to said star wheel. Immediately after the star wheel 66 passes out of engagement with a projected core 76, said core is reset or retracted by a presser foot 87 on the counter 64 and which presser foot slides with a yielding action on the inner face of the guide ring 88 and successively engages the projected cores 76 with a cam action that retracts the same. At the completion of the resetting of the projected cores 76, the counter 64 is positioned, as shown in Figs. 4 and 13, and in which position of said counter it is directly over the top portion of the answer sheet 31. With the counter 64 thus positioned downward pressure on the hand piece 69 will spring the arm 67 and position the type characters of the rotary counter members 65 on the answer sheet 31 and thereby impress or stamp its set type numerals on said sheet.

Key sheet—answer sheet

The key sheet 30 and answer sheet 31, as shown, are ruled to form on each thereof two series of squares or spaces or areas and each series thereof includes five vertical columns of squares of fifty squares in each row. Said columns in each series are designated by the letters A, B, C, D, E, reading from left to right, and the squares in each column of the left hand series are numbered 1 to 50 and the squares in each column of the right hand series are numbered 51 to 100. The numerals 1 to 50 and 51 to 100 read from the top down. It may be here stated that the present machine contains one hundred slugs making it possible to answer one hundred questions, and hence, there is one slug for each horizontal row of five squares in each series and the cam surfaces A', B', C', D', E', on each slug, correspond to the columns A, B, C, D, E.

The squares on the two sheets 30—31 are identical as to size, location, and number, so that when said sheets are placed on the bed 3 and positioned by the register guides 32, correspondingly designated squares are in registration, the one with the other. In fact, the two sheets may be interchangeably used but preferably the key sheet 30 will be made of a heavier stock than the answer sheet 31.

When the two sheets 30 and 31 are placed in the machine and positioned by the register guides 32 and the head 4 closed, their aligned squares are directly over the selector pins 14 with the axes of said pins at the center of said squares.

Frequency of error sheet

The frequency of error sheet 43 is horizontally ruled to correspond to the spacing of the horizontal squares on the sheets 30 and 31 and are also vertically ruled to form two columns. The horizontal lines of the right hand column are numbered 1 to 50 and the horizontal lines of the left hand column are numbered 51 to 100. It will be noted that the numbering of the horizontal lines of the two vertical columns of the frequency of error sheet 43 are in reverse order from that of the two sheets 30 and 31 for the reason that the frequency of error sheet 43, when placed in the machine, is upside down which brings its numbered lines into registration with correspondingly numbered horizontal rows of squares on the two sheets 30 and 31.

Used in connection with the machine is a printed question sheet or sheets 88 which may be loose or bound and may have any number of questions from 1 to 100 which is the capacity of the present machine. Each numbered question on the sheet 88 may be answered as designated by the letters a, b, c, d, e, and which designations correspond to like designations on the sheets 30 and 31 and also like designations of the cam surfaces 12 on the slugs 8.

From the above description it is evident that when the key sheet 30, the answer sheet 31, and the frequency of error sheet 43 are in the machine and the head 4 closed, the slugs 8, the horizontal rows of squares on the sheets 30 and 31, and the vertical lines on the frequency of error sheet 43, having the same numerals, are in coincident relation, and that the cam surfaces 12 on the slugs 8 and columns of squares on the sheets 30 and 31, having the same designating letters, are also in coincident relation.

As previously stated, the invention provides mechanical means for selecting incorrect answers from correct answers on certain educational test papers, to count and register the incorrect answers, and to make a frequency of error record.

Examples of types of questions

One type of question which may be used with this machine is what is commonly called the "Multiple choice" question.

The following is one example of a multiple choice question:

Which is the correct answer to the following statement?

Unorganized counties are governed by—
 a. A special representative
 b. Being attached to another county
 c. The State legislature
 d. County commissioners
 e. The Governor of the State A second type of question which may be used with this machine is what is often called a Yes—No question. It is so worded that its correct answer will be either Yes or No.

Example.—Will a fully charged car battery freeze in cold weather?

A third type of question which may be used with this machine is what is commonly known as the True—False question or statement.

Example.—A straight line is any distance between two points

Such a question is answered by indicating either the word True or the word False.

A fourth type of question which may be used with this machine is the "Matching" type of question.

*Example.*—Match the State capitals in column "B" with the correct state in column "A"

| A | B |
|---|---|
| Minnesota | Albany |
| North Dakota | Pierre |
| New York | St. Paul |
| South Dakota | Madison |
| Wisconsin | Bismarck |

There are still other forms of questions, suitable for use with this machine, such as identification of machine parts, map locations, etc. This may be done by having each part, location, or point, designated by the same character to wit: the letters a, b, c, d, e, as are used to designate the various columns of the answer sheet 31, or, when two or more horizontal rows of squares are used for one answer, the area characters to wit: the numerals 1 to 50 and 51 to 100 rather than the column characters to wit: the letters a, b, c, d, e, are used.

Key sheet

The key sheet 30, see Fig. 4, is prepared by cutting out all of the possible wrong answer squares and leaving undisturbed the squares representing the correct answers. In the drawings the cut out squares are solid black and the undisturbed squares are white. For example, take the multiple choice question number 1 on the question sheet 88, see Fig. 17 and consider b the correct answer. The key sheet 30 for this question would be prepared by cutting out all of the squares in row number 1 except the one in b column.

Another example of preparing the key sheet 30, take the Yes—No type of question number 51 on the question sheet 88, since the answer is No the square in row 51 on the answer sheet 31 column b would be left undisturbed and the square in column e cut out.

Answer sheet

The answer sheet 31 and a copy of the question sheet 88 is given to a student and he answers the question on the question sheet 88 by punching or piercing the respective squares on said answer sheet by means of a pencil. This punching may be easily done by holding part of the answer sheet 31 over the edge of a desk and placing the point of the pencil in the center of the square to be punched and then applying sufficient pressure to the pencil to pierce the sheet 31 and form therein a hole as large as the body of the pencil which is substantially the entire area of the square. To assist in punching the answer sheet 31 with a pencil, the squares in said sheet may be weakened by scoring or otherwise.

Multiple choice questions

An example as to how a multiple choice question may be answered, take for instance question number 1 on the question sheet 88, if the student thinks "being attached to another county" is the correct answer, he will punch a hole with his pencil through the square in row 1, column b of the answer sheet 31. Should the student think that the "county commissioners govern unorganized counties", he will punch the square in row 1, column d. It is, of course, evident that the student, upon deciding on the answer to a given question, notes the row number and column letter and punches the square on the answer sheet 31 having the same designations.

Yes—No questions

With Yes—No questions, the a, b, c, d, and e designations for the columns on the answer sheet 31 are ignored and two of these columns, to wit: d and e, are designated as Yes—No columns, respectively, by having the words printed thereon, see Fig. 16. As an example, the student who wishes to say Yes to the 51st question on the question sheet 88, will punch a hole in the Yes column in row 51 on the answer sheet 31, and the student who wishes to say No will punch the square in the No column in rows 51.

True—False questions

True—False questions are answered in the same manner as Yes—No questions and columns a and b have been designated as True—False columns, respectively, by having the words printed thereon, see Fig. 16.

Matching questions

Figures 1, 20:
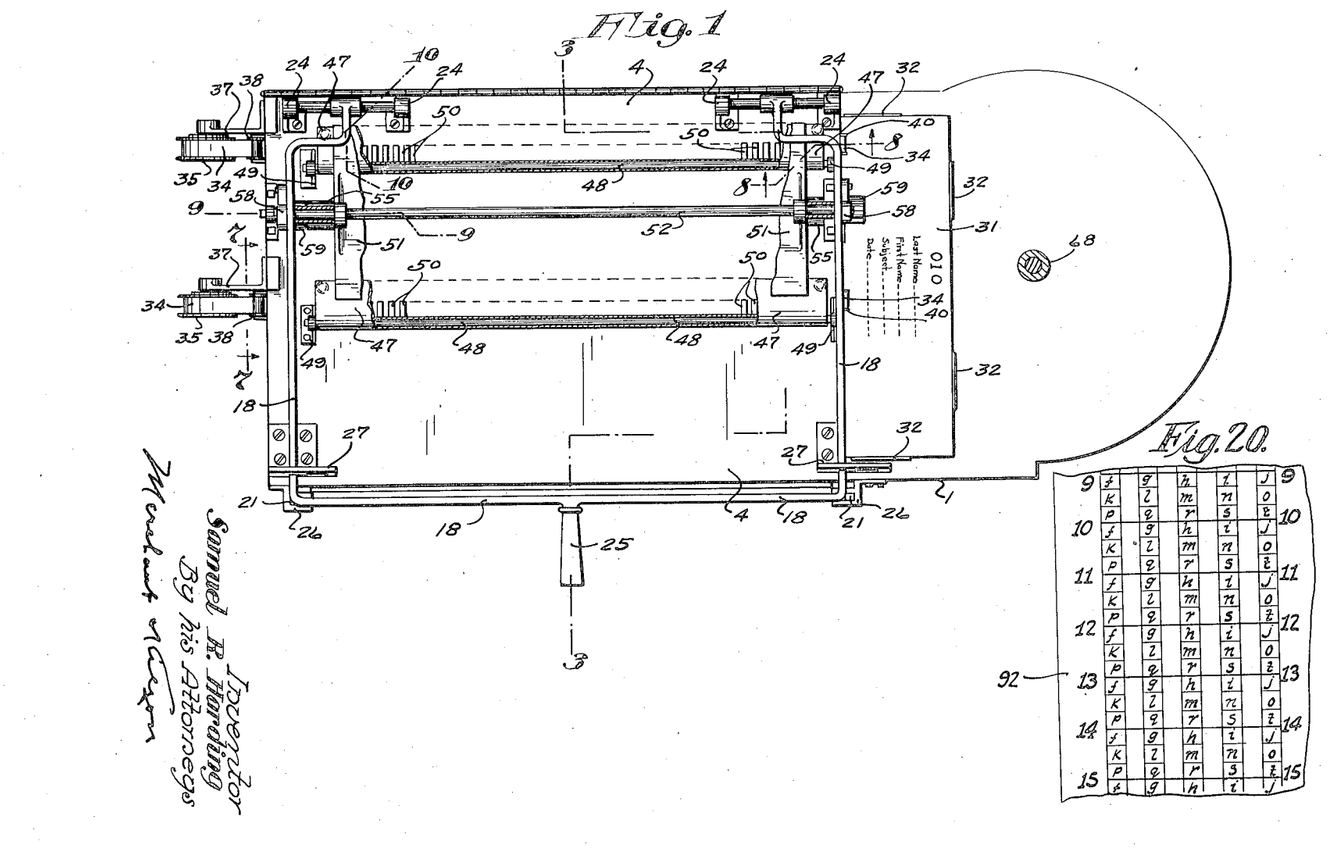
Fig. 1 is a plan view of the improved machine with some parts broken away and other parts shown in horizontal section.
Fig. 20 is a fragmentary view showing another form of answer sheet.

When the question sheet 88 includes "Matching questions" a slightly different form of answer sheet will be required, and wherein a plurality of rows of squares will be used for a single question. If more than one row of squares is used for a single question, the group of squares for the number of each question will be individually designated by letters of the alphabet. In this form of answer sheet the column designations a, b, c, d and e, will be ignored and to avoid confusion the first five letters of the alphabet will not be used in designating the squares of a given group, see Fig. 20, answer sheet 92 as an illustration.

*Example.*—Questions 9 to 23 inclusive in a history test might read: The suggestions in column "X" remind you of which men in column "Y"?

X
9. Louisiana Purchase
10. Spoils System
11. Invention of Steam Boat
12. Fall of Richmond
13. Missouri Compromise
14. Invention of the Telephone
15. Monroe Doctrine
16. President of Confederacy
17. Harper's Ferry
18. Invention of Telegraph
19. Whiskey Rebellion
20. Civil War
21. Panic of 1837
22. Spanish-American War
23. World War Y
f. Wilson
g. Henry Clay
h. John Brown
i. George Washington
j. Thomas Jefferson
k. Robert Fulton
l. Martin Van Buren
m. Alexander Graham Bell
n. Robert E. Lee
o. Abraham Lincoln
p. McKinley
q. Morse
r. Monroe
s. Andrew Jackson
t. Jefferson Davis The student who selects the correct answer—Thomas Jefferson—for question number 9, (Louisiana Purchase), will punch a hole in the "j" area in one of question nine's three levels. This "j" area, when placed in the machine for checking, will be protected by the key sheet 30 or one of the slides 62. None of the other fourteen areas for question number 9 will be so protected. Thus should the student punch any area except the "j" area some one of the three slugs 8 over the areas for question number 9 would register an error.

Answer space number 10 would be used for the pupil's choice for the —Spoils System—, selecting his answer from column "Y". Each answer space has the same lettered areas as the letters found in column "Y", therefore, any one of the answers in column "Y" may be used for any one of the questions in column "X".

Operation

The operation of the educational test checking machine illustrated may be briefly described as follows: From the question sheet 88 the teacher prepares the key sheet 30 by cutting out all squares of the wrong answers and leaving the squares for the correct answers undisturbed. Each student taking the test is given an answer sheet 31 and a copy of the question sheet 88 and answers the questions on the sheet 88 by punching holes in certain of the squares on the answer sheet 31 for the answers which he thinks are correct. After the student has answered the questions by piercing the squares in the answer sheet 31, which he thinks represents the correct answers to the questions on the sheet 88, said answer sheet 31 is given to the teacher.

The teacher then places the prepared key sheet 30 on the bed 3, which is accurately positioned by the register guides 32 with respect to the selector pins 14, and the prepared answer sheet 31 is next placed on the key sheet 30 and also accurately positioned by the register guides 32 with respect thereto. With the sheets 30 and 31 thus positioned in the machine the head 4 is closed and locked by the latch 6. During movement of the head 4 from its open horizontal position, as shown in Fig. 4, to a closed position, as shown in Fig. 3, the slugs 8, will be automatically reset by sliding in their ways 7, under the action of gravity, to their extreme left hand or normal positions.

This resetting of the slugs 8 will position the type characters 13 on the ledges 10, will move the type characters 44 from under the spring fingers 50, and position the notches 45 in said slugs under said fingers and will carry the shoulders 86 into contact with the trip fingers 84 and thereby lift the movable switch contacts 83 out of contact with the fixed switch contacts 82, thus breaking the branch leads 74. The counter 64 is next positioned, as shown in Fig. 13, which opens the switch 73 and breaks the circuit from the source of potential 70.

The head 4 being lock closed, as previously stated, the operator moves the lever 18 out of the gate lock notches 29 and downwardly onto the stop surfaces 46. This initial movement of the lever 18, acting through the connections 21, 19 and 22, lifts the carrier 16 and projects the selector pins 14. The upper sections of all of the selector pins 14, that engage parts of the key sheet 30 that have not been cut out, will be stopped and further movement of the lower sections of said pins will compress the respective springs 15. The upper sections of all of the selector pins 14, that have passed through cut out squares in the key sheet 30, will engage the answer sheet 31 and further projecting movement thereof will be stopped thereby except where said answer sheet 31 has been pierced to form holes that register with the cut out squares in the key sheet 30 and in which case the upper sections of the selector pins 14 will pass therethrough. All selector pins 14 passing through aligned holes in the two sheets 30 and 31 will engage the aligned cam surfaces 12 and slide the respective slugs 8 to the right or into wrong answer positions.

This movement of the wrong answer slugs 8 by the selector pins 14 will position the type characters 13, by a slight tilting movement of said slugs, on the lower sections of the ribbons 34, and the type characters 44 will be positioned under the spring fingers 50 with the upper sections of the ribbons 34 resting thereon and will also move the shoulders 86 on said slugs from under the switch fingers 84 and allow the movable contacts 83 to snap into engagement with the fixed contacts 82 which closes their branch leads 74 but at this same time the circuit from the source of potential 70 is broken by the open switch 73. The slugs 8 moved by the selector pins 14, of course, represent incorrect answers on the answer sheet 31.

From the above description it is evident that selector pins 14 that represent correct answers are stopped either by the key sheet 30 or the answer sheet 31 and that the selector pins 14 representing incorrect answers pass through aligned holes in the two sheets 30 and 31 and operate the slugs 8.

The next operation of the machine by the operator is to move the lever 18 from the stop surfaces 46 downwardly and into the gate lock notches 28. This final movement of the lever 18 applies pressure to the fingers 50 through the connections thereto and which pressure is transmitted to the wrong answer slugs 8 which have a base of resistance on the bed 3. This pressure on the wrong answer slugs 8 causes the type characters 13, resting on the ribbons 34, to make imprints on the answer sheet 31 at the left of each series of columns a, b, c, d, e, and aligned with the respective horizontal rows of squares as indicated at 89, see Fig. 16, so that the teacher may tell at a glance which questions have been incorrectly answered. This same pressure on the wrong answer slugs 8 causes the type characters 44, on which the ribbons 34 rest, to make imprints on the frequency of error sheet 43 and on the lines having the same designating numbers as the questions on the sheet 88 and answers on the sheet 31, as indicated at 90, see Fig. 18.

At the completion of the operation of the lever 18 the operator swings the carrier arm 67 anti-clockwise and positions the same, as indicated by broken lines in Fig. 13, to close the switch 73 by positioning the movable contact thereof on the fixed contacts. This closing of the switch 73 completes the circuit from the source of potential 70 to the branch leads 74 of the closed switches 78 and energizes the respective coils 75. The floating cores 76 in the energized coils 75 are projected into the path of movement of the star wheel 66. Further anti-clockwise movement of the carrier arm 67 will open the switch 73 and thereby de-energize the coils 75 and as the star wheel 66 successively engages the projected cores 76, steps of rotary movement will be imparted thereto that operates the counter 64.

Following the engagement of the star wheel 66 with the projected cores 76, the presser foot 87 engages said cores with a cam action and returns the same to normal position in which said cores are out of the path of movement of the star wheel 66. At the completion of the anti-clockwise movement of the counter 64, the same is positioned over the exposed upper end portion of the answer sheet 31, as shown by full lines in Figs. 2 and 4. In this position of the counter 64 downward pressure on the hand piece 69 will spring the carrier arm 67 and position the exposed type character on the rotary counter members 76 on the answer sheet 31 and leave their imprint thereon, as indicated at 91, see Fig. 16. This imprint made by the counter 64 on the answer sheet 31 shows the number of incorrect answers on a given answer sheet 31.

To remove the answer sheet 31 from the machine the lever 18 is moved from the gate lock notches 28 upwardly into the gate lock notches 29 and thereafter the latch 6 is operated to release the head 4 and said head swung into an open position, as shown by full lines in Fig. 4.

During the opening of the head 4 the vacuum cups 61 lift the answer sheet 31 from the bed 3 and into a position in which it may be very quickly and easily removed from said head.

It may be here stated that the length of the passage 42 corresponds to the length of the frequency of error sheet 43 with working clearance therebetween and holds said sheet with the spaces between its numbered lines in registration with correspondingly numbered slugs 8 so that the type characters 44 will make their impressions on the proper lines or in the proper spaces on the frequency of error sheet 43. The feed roll 55, of course, moves the frequency of error sheet 43 edgewise in the passage 42 from the front to the rear of the machine with just enough clearance between the impressions to make the same read clearly.

Each time the lever 18 is operated to release the carrier 16 and return the selector pins 14 to normal positions the pawl 58 is automatically operated to impart a step of rotary movement to the feed roll 55 and move the frequency of error sheet 43 transversely on the head 4 to space the imprints thereon made by the type characters 44. It will thus be seen that all of the imprints made by a given type character 44 will be made on the corresponding line of the frequency of error sheet 43.

Answer sheets 31 prepared by students are successively placed in the machine on the key sheet 30 and the machine successively operated in the manner just described until all of the answer sheets 31 have been corrected.

One of the leading reasons for giving tests in school work is to determine what portion of the work covered is fully understood by the class as a whole and what portion of the work needs further emphasis in future lessons. For example, if seventy-five per cent (75%) of the class have answered a certain question incorrectly the teacher should be aware of this fact so that suitable emphasis may be placed on that question in future lessons. If all members of the class answer certain questions correctly these, too, should be known by the teacher so that valuable time need not be wasted covering future instructions on points covered by these correctly answered questions. The growing practice of diagnostic testing emphasizes the need of just such analysis of test results.

The frequency of error sheet 43, used in this machine, will give the teacher this exact information on every question just as soon as the last paper, to wit: answer sheet 31, has been passed through the machine. As shown in Fig. 18, there is a mark or imprint 90 made by one of the type characters 44 for each time a question is answered incorrectly. The total number of imprints 90 for the individual questions appearing on the numbered lines of the fragmentary frequency of error sheet 43 for the respective questions, represent the total number of incorrect answers.

The frequency of error sheet 43 illustrated indicates that only two students in the entire class missed, incorrectly answer question No. 1 of the test. Question No. 2 was answered incorrectly by none of the members of the class. The same is true of question No. 3. Question No. 4 was answered incorrectly by a total of twelve different members of the class. Question No. 5 was answered correctly. Question No. 51 was missed by four different students. Question No. 52 was missed by only one student and the same is true of question No. 53. Question No. 54 was answered correctly by all of the students.

This section of the frequency of error sheet 43 clearly shows that the teacher, when planning future lessons, need pay no attention whatever to the subject matter covered by questions 2, 3 and 54; little attention to that covered by questions 1, 51, 52 and 53, but should strongly emphasize the subject matter called for in question 4.

By reference to Fig. 4 it will be noted that the squares in line 1, columns a, c, d, e of the key sheet 30 have been cut out by the teacher and they represent incorrect answers and the other square, to wit: the one in column b is undisturbed indicating a correct answer. The student has pierced the square in line 1, column b of the answer sheet 31 which is coincident with the undisturbed square on the key sheet 30 and is the correct answer, see Fig. 16. By reference to Fig. 3 it will be noted that all of the selector pins 14, in the left hand series, have been intercepted by the answer sheet 31 with the exception of the one in column b which has been intercepted by the key sheet 30. It will thus be seen that all of the selector pins 14 of the respective slugs 8 have been intercepted indicating that the student has answered the respective question correctly.

Referring now to question 51 on the question sheet 88, which is a Yes—No question, it will be noted that the squares in line 51 of the key sheet 30 columns a, b, c, d, are cut out indicating incorrect answers and that the square in column e is undisturbed indicating a correct answer, see Figs. 3 and 4. By reference to the answer sheet 31, see Fig. 16, it will be noted that the student has pierced the square in line 51, column d which is the wrong answer and the hole thus formed is coincident with the cut out square on the key sheet 30. These coincident holes have permitted the aligned selector pins 14 to pass therethrough, to engage the aligned cam surface 12, and to move the respective slug 8 to its wrong answer position, see Fig. 3. Selector pins 14 in columns a, b and c of the respective group have been intercepted by the answer sheet 31 and the selector pins 14 in column e has been intercepted by the key sheet 30.

*The machine used without a key sheet*

Referring now to the mechanical stops or slides 62, shown in Fig. 19, which are positioned in the channels 63 to represent correct answers and intercept the respective selector pins 14 when projected to prevent the same from passing through pierced squares in the answer sheet 31 to represent incorrect answers. The other selector pins 14, that are not intercepted by the stops 62, will engage the answer sheet 31 and be intercepted thereby, except the squares that have been pierced by the student and represent wrong answers. The pierced holes representing correct answers, as given by the student, are covered by the stops 62. Selector pins 14 passing through pierced holes in the answer sheet 31 will engage the aligned cam surface 12 and move the respective slugs 8 into wrong answer position.

If a test is to be corrected without the use of a key sheet, the machine will be set for the particular test by setting all the necessary stops 62 for the various questions before the correcting process is started. When a certain group of questions are to be used only once, it will probably be more convenient to use the stops 62 than to prepare the answer sheet 30. However, for sets of questions which are to be used from time to time, the key sheet 30 will probably be more convenient.

The word "register" is herein used in a broad sense to cover the slugs 8 or any other type of slides or devices that are operated or moved to indicate wrong answers. It is, of course, understood that the machine may be designed and operated to register or indicate correct answers instead of wrong answers.

From the foregoing it must be evident that the invention herein disclosed is capable of large range of modification within the spirit of the invention herein disclosed and claimed.

What I claim is:

1. In a device of the class described, a plurality of type bars, a plurality of selectors for operating the type bars, means for operating the selectors, means for individually intercepting the selectors when operated to actuate the type bars, a sheet having areas in the same general relation as the selectors, and means for holding the sheet with its areas in predetermined relation to the selectors and in their paths of movement when operated to actuate the type bars, said sheet in certain of its areas being pierced, whereby when the selectors are operated to actuate the type bars certain thereof will pass through pierced areas of the sheet and certain other of the selectors will be stopped by the sheet or the intercepting means.

2. The structure defined in claim 1 in which the selectors are simultaneously operated by said selector operating means.

3. The structure defined in claim 1 which further includes operable means for simultaneously resetting the type bars.

4. The structure defined in claim 1 in which each type bar is provided with a type character, and which structure further includes means for impressing the type character of an actuated type bar on the sheet.

5. The structure defined in claim 1 in which each type bar is provided with a type character, and which structure further includes means actuated by the selector operating means for impressing the type character of an actuated type bar on the sheet.

6. The structure defined in claim 1 in which each type bar is provided with two type characters, means for impressing one of the type characters of an actuated type bar on the sheet, and other means for impressing the other type character of an actuated type bar on a record sheet.

7. The structure defined in claim 1 in which each type bar is provided with two type characters, means for impressing one of the type characters of an actuated type bar on the sheet, and other means actuated by the selector operating means for impressing the other type character of an actuated type bar on a record sheet.

8. The structure defined in claim 1 in which each type bar is provided with two type characters, means for impressing one of the type characters of an actuated type bar on the sheet, and other means for impressing the other type character of an actuated type bar on a record sheet, and automatic means for imparting a step of movement to the record sheet for each cycle of operation of the device.

9. In a device of the class described, a plurality of type bars, a group of selectors for each type bar, means for operating the selectors to actuate the type bars, a master key sheet, a secondary sheet, said two sheets having corresponding areas in the same general relation, passages through certain of the areas on the master key sheet, the secondary sheet in certain of its areas being pierced, means for holding the two sheets positioned with their corresponding areas coincident and in predetermined relation to the selectors for intercepting said selectors when moved to actuate the type bars except where the pierced areas of the secondary sheet are coincident with the respective passages in the master key sheet.

10. In a device of the class described, a plurality of type bars, a plurality of selectors for operating the type bars, means for operating the selectors, a master key sheet and a secondary sheet, said two sheets having corresponding areas in the same relation and in the same general relation as the selectors, means for holding the two sheets with their corresponding areas coincident, passages extending through the master key sheet in certain of its areas, the secondary sheet in certain of its areas being pierced, whereby when the selectors are operated to actuate the type bars certain thereof will pass through the passages in the master sheet and through the secondary sheet when its pierced areas are coincident with said passages and others of said selectors will be intercepted either by the master key sheet or the secondary sheet.

11. The structure defined in claim 10 in which there is a plurality of selectors for each type bar.

12. In a device of the class described, a displaceable head, a plurality of type bars mounted in the head for movement to and from operative positions and normally set in inoperative positions, a bed, a group of normally retracted selector pins for each type bar, any one of which, when projected, will move said type bar from an inoperative to an operative position, said selector pins being mounted in ways in the bed for endwise movement, a carrier for the selector pins, means for operating the carrier to project or retract the selector pins, means for individually intercepting the selector pins when projected, a sheet having areas in the same general relation as the selector pins, and means for holding the sheet between the bed and head with its areas in predetermined relation to the selector pins and in their paths of movement when projected, said sheet in certain of its areas being pierced, whereby when the selector pins are projected the pins in registration with the pierced areas of the sheet will pass through the sheet if not interrupted by the intercepting means.

13. The structure defined in claim 12 in which each type bar is a slug having a cam surface for each selector pin of the respective group and when one of the cam surfaces is engaged by a projected selector pin it will move said slug from an inoperative to an operative position.

14. The structure defined in claim 12 in which each selector pin is provided with compressible means that will yield when the movement of a projected pin is interrupted by the intercepting means.

15. The structure defined in claim 12 in which each selector pin is provided with a section that is compressible longitudinally thereof.

16. The structure defined in claim 12 in which each selector pin comprises two sections and a spring interposed between said sections and normally holding the same endwise spaced.

17. The structure defined in claim 12 in which each type bar is provided with a type character, and means operative to impress the type character of the type bar when in an operative position.

18. In a device of the class described, a bed, a displaceable head over the bed, a carrier under the bed, a plurality of type bars mounted in the head for movement to and from an operative position and normally set in an inoperative position, a group of selector pins for each bar, said pins being mounted on the carrier and extending through guides in the bed, each bar having a cam surface for each selector pin of the respective group and arranged to be engaged by the pins when projected to move said bar from an inoperative to an operative position, means for operating the carrier to project or retract the selector pins, means for intercepting the selector pins when projected, a sheet having areas in the same general relation as the selector pins, and means for holding the sheet between the bed and head with its areas in predetermined relation to the selector pins in their paths of movement when projected, said sheet in certain of its areas being pierced, whereby when the selector pins are projected by the carrier certain thereof will pass through the sheet at its pierced areas if not interrupted by the sheet or the intercepting means and operate the respective type bars.

19. The structure defined in claim 18 in which each bar is provided with a type character, and which structure further includes means for applying pressure to a bar when in an operative position to impress its type character on the sheet, said pressure-applying means being actuated by the carrier-operating means in timed relation to the movement of the carrier to project the selector pins.

20. The structure defined in claim 18 in which each bar is provided with two type characters, and which structure further includes means for holding a record sheet on the head, and means for applying pressure on a bar when in an operative position to impress one of its type characters on the first noted sheet and for impressing its other type character on the record sheet.

21. The structure defined in claim 18 in which each bar is provided with two type characters, and which structure further includes means for holding a record sheet on the head, and means actuated by the carrier operating means for applying pressure on a bar when in an operative position to impress one of its type characters on the first noted sheet and for impressing its other type character on the record sheet.

22. The structure defined in claim 18 in which each type bar is provided with two type characters, and which structure further includes means for holding a record sheet on the head, a platen carried by the head, and means for operating the platen to apply pressure on the type bars when in operative positions to impress one of the type characters on each set bar on the sheet and to impress the remaining type character on each set bar on the record sheet.

23. The structure defined in claim 18 in which each type bar is provided with two type characters, and which structure further includes means for holding a record sheet on the head, a platen carried by the head and having a yielding member for each type bar, and means for operating the platen to place the spring members under tension and apply pressure on the type bars when in operative positions to impress one of the type characters on each set bar on the sheet and to impress the remaining type character on each set bar on the record sheet.

24. The structure defined in claim 18 in which each type bar is provided with two type characters, and which structure further includes means for holding a record sheet on the head, a platen carried by the head and having a yielding member for each type bar, and means actuated by the carrier operating means for operating the platen to place the spring members under tension, in timed relation with the movement of the carrier to project the selector pins, and apply pressure on the type bars when in operative positions to impress one of the type characters on each set bar on the sheet and to impress the remaining type character on each set bar on the record sheet.

SAMUEL R. HARDING.